(12) United States Patent
Jiang et al.

(10) Patent No.: US 10,178,658 B2
(45) Date of Patent: Jan. 8, 2019

(54) BASE STATION, USER EQUIPMENT AND ASSOCIATED METHODS

(71) Applicant: Sharp Kabushiki Kaisha, Sakai, Osaka (JP)

(72) Inventors: Qi Jiang, Shanghai (CN); Renmao Liu, Shanghai (CN); Xingya Shen, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/323,124

(22) PCT Filed: Jul. 1, 2015

(86) PCT No.: PCT/CN2015/083044
§ 371 (c)(1),
(2) Date: Dec. 30, 2016

(87) PCT Pub. No.: WO2016/004828
PCT Pub. Date: Jan. 14, 2016

(65) Prior Publication Data
US 2017/0135075 A1 May 11, 2017

(30) Foreign Application Priority Data

Jul. 8, 2014 (CN) .......................... 2014 1 0323464

(51) Int. Cl.
*H04W 72/04* (2009.01)
*H04W 72/12* (2009.01)
(Continued)

(52) U.S. Cl.
CPC ....... *H04W 72/042* (2013.01); *H04W 72/048* (2013.01); *H04W 72/1273* (2013.01);
(Continued)

(58) Field of Classification Search
CPC ............ H04W 72/042; H04W 72/048; H04W 72/1273; H04W 88/06; H04W 72/0446; H04B 7/2618
(Continued)

(56) References Cited

U.S. PATENT DOCUMENTS

2013/0223353 A1 8/2013 Liu et al.
2013/0322413 A1* 12/2013 Pelletier ............ H04W 72/1289
370/336
(Continued)

OTHER PUBLICATIONS

Official Communication issued in International Patent Application No. PCT/CN2015/083044, dated Sep. 25, 2015.
(Continued)

*Primary Examiner* — Robert J Lopata
(74) *Attorney, Agent, or Firm* — Keating & Bennett, LLP (57) ABSTRACT

The present disclosure provides a method in a base station. The method comprises: transmitting resource configuration information to a User Equipment (UE). The resource configuration information comprises: a transmission pattern index indicating an index of a transmission pattern candidate to be used by the UE for Device-to-Device (D2D) data transmission within a D2D data time window in a set of all transmission pattern candidates; Scheduling Assignment (SA) time window information indicating a size of a SA time window to be used by the UE for D2D SA transmission; and data time window information indicating a size of a data time window to be used by the UE for D2D data transmission.

4 Claims, 2 Drawing Sheets

(51) Int. Cl.
*H04W 76/14* (2018.01)
*H04W 88/06* (2009.01)

(52) U.S. Cl.
CPC ........ *H04W 76/14* (2018.02); *H04W 72/0446* (2013.01); *H04W 88/06* (2013.01)

(58) Field of Classification Search
USPC ........................................................ 370/336
See application file for complete search history.

(56) References Cited

U.S. PATENT DOCUMENTS

| | | | |
|---|---|---|---|
| 2015/0271800 A1* | 9/2015 | Panteleev | H04W 72/042 370/329 |
| 2015/0271846 A1* | 9/2015 | Kowalski | H04W 72/14 370/329 |
| 2017/0027014 A1* | 1/2017 | Chae | H04B 7/2656 |
| 2017/0118621 A1* | 4/2017 | Sorrentino | H04W 8/005 |
| 2017/0150330 A1* | 5/2017 | Kim | H04W 4/08 |
| 2017/0164381 A1* | 6/2017 | Kim | H04W 72/12 |
| 2017/0181186 A1* | 6/2017 | Seo | H04W 72/042 |
| 2017/0195163 A1* | 7/2017 | Chae | H04L 29/08477 |
| 2017/0208587 A1* | 7/2017 | Chae | H04W 72/0446 |
| 2017/0273077 A1* | 9/2017 | Kim | H04W 72/0446 |
| 2018/0035410 A1* | 2/2018 | Panteleev | H04W 72/042 |

OTHER PUBLICATIONS

Intel Corporation, "eNB Controlled Resource Allocation for D2D Communication", 3GPP TSG RAN WG1 Meeting #77, R1-142017, May 19-23, 2014, pp. 1-6.

\* cited by examiner

BASE STATION, USER EQUIPMENT AND ASSOCIATED METHODS

TECHNICAL FIELD

The present disclosure relates to wireless communications, and more particularly, to a base station, a User Equipment (UE) and associated methods.

BACKGROUND

Modern wireless mobile communication systems have two significant characteristics. The first one is broadband and high rate. For example, the fourth generation wireless mobile communication systems have up to 100 MHz of bandwidth and up to 1 Gbps of downlink rate. The second one is mobile interconnecting, which enables emerging services such as mobile internet, mobile video on demand, online navigation, and the like. These two characteristics have higher requirements on the wireless mobile communication technology, including ultrahigh rate wireless transmission, inter-area interference suppression, reliable signal transmission while moving, distributed/centered signal processing, etc. In the enhanced fourth generation (4G) and the fifth generation (5G) in the future, in order to meet the above development requirements, various key techniques have been proposed and discussed, and are worth extensive attention of researchers in the related field.

In October of 2007, the International Telecom Union (ITU) has approved the Worldwide Interoperability for Microwave Access (WiMAX) as the fourth 3G system standard. This event, which happened at the end of the 3G era, is in fact a rehearsal of the 4G standard war. Indeed, in order to confront the challenges from the wireless IP technology represented by wireless local area network (WLAN) and WiMAX, the 3GPP organization has set out to prepare for its new system upgrade—standardization of the Long Term Evolution (LTE) system. As a quasi-4G system which is based on Orthogonal Frequency Division Multiplexing (OFDM), the LTE system had its first release published in 2009, and was subsequently put into commercial use in 2010. Meanwhile, the standardization of the 4G wireless mobile communication system was also started by 3GPP in the first half of 2008, and this system were referred to as Long Term Evolution Advanced (LTE-A). The critical standard specification for physical layer procedures of that system was completed in early 2011. In November of 2011, the ITU officially announced in Chongqing, China that the LTE-A system and the WiMAX system are two official standards for 4G systems. Nowadays, global commercialization of the LTE-A system is progressing step by step.

According to the challenges of the next decade, the enhanced fourth generation wireless mobile communication systems have generally the following development requirements:

Higher wireless broadband rate and optimization of local cell hot spots;
Further improved user experience, especially optimization of communication services for cell border areas;
Continuous researches on new techniques capable of improving spectral utilization, due to impossibility of 1,000 times of expansion of available spectrums;
Use of high frequency spectrums (5 GHz or even higher) to obtain large communication bandwidth;
Cooperation with existing networks (2G/3G/4G, WLAN, WiMax, etc.) to share data traffic;
Specific optimization for different traffics, applications and services;
Enhanced system capabilities for supporting large scale Machine Type Communications;
Flexible, intelligent and inexpensive network planning and deployment; and
Designs for saving power consumptions of networks and UE batteries.

In order to achieve the above development requirements, the $3^{rd}$ Generation Partner Project (3GPP) organization has discussed and accepted Device-to-Device (D2D) communication technique as a key technique in the enhanced fourth generation wireless mobile communication systems.

The D2D technique allows local communications or peer-to-peer communications, without access to core networks. With transmissions based on the D2D technique, loads on base stations can be effectively reduced and life time of mobile terminal batteries can be effectively prolonged. Generally, according to the whether there is coverage of a macro base station in the environment where UEs for D2D transmissions (referred to as D2D UEs hereinafter) are located, scenarios for the D2D UEs can be divided into network coverage, no network coverage and partial network coverage. In the partial network coverage scenario, there are D2D UEs with network coverage and D2D UEs without network coverage.

Currently, for D2D communications, especially those with coverage of base station, 3GPP has decided to use Physical Downlink Control Channel (PDCCH) and Enhanced PDCCH (EPDCCH) for transmitting D2D grant information for D2D Scheduling Assignment (SA) and D2D data (DATA). When a D2D UE receives a subframe contain the D2D grant information, it can transmit D2D SA and D2D data to another D2D UE based on the grant information. However, after receiving the grant information, the D2D UE does not know over which resources (time-frequency resources) it should transmit the D2D SA and D2D data.

There is thus a need for a new solution for controlling resources to be used by a UE for transmission of D2D SA and D2D data.

SUMMARY

It is an object of the present disclosure to provide a base station, a UE and associated methods, capable of controlling resources to be used by a D2D UE for transmission of D2D SA and D2D data.

In a first aspect of the present disclosure, a method in a base station is provided. The method comprises: transmitting resource configuration information to a User Equipment (UE). The resource configuration information comprises: a transmission pattern index indicating an index of a transmission pattern candidate to be used by the UE for Device-to-Device (D2D) data transmission within a D2D data time window in a set of all transmission pattern candidates; Scheduling Assignment (SA) time window information indicating a size of a SA time window to be used by the UE for D2D SA transmission; and data time window information indicating a size of a data time window to be used by the UE for D2D data transmission.

In an embodiment, the transmission pattern index, the SA time window information and the data time window information are carried by Radio Resource Control (RRC) signaling.

In a second aspect of the present disclosure, a base station is provided. The base station comprises: a transmitting unit configured to transmit resource configuration information to a User Equipment (UE). The resource configuration information comprises: a transmission pattern index indicating an index of a transmission pattern candidate to be used by the UE for Device-to-Device (D2D) data transmission within a D2D data time window in a set of all transmission pattern candidates; Scheduling Assignment (SA) time window information indicating a size of a SA time window to be used by the UE for D2D SA transmission; and data time window information indicating a size of a data time window to be used by the UE for D2D data transmission.

The embodiments of the method in the first aspect also apply to the base station.

In a third aspect of the present disclosure, a method in a User Equipment (UE) is provided. The method comprises: receiving resource configuration information from a base station. The resource configuration information comprises: a transmission pattern index indicating an index of a transmission pattern candidate to be used by the UE for Device-to-Device (D2D) data transmission within a D2D data time window in a set of all transmission pattern candidates; Scheduling Assignment (SA) time window information indicating a size of a SA time window to be used by the UE for D2D SA transmission; and data time window information indicating a size of a data time window to be used by the UE for D2D data transmission.

In an embodiment, the transmission pattern index, the SA time window information and the data time window information are carried by Radio Resource Control (RRC) signaling.

In a fourth aspect of the present disclosure, a User Equipment (UE) is provided. The UE comprises: a receiving unit configured to receive resource configuration information from a base station. The resource configuration information comprises: a transmission pattern index indicating an index of a transmission pattern candidate to be used by the UE for Device-to-Device (D2D) data transmission within a D2D data time window in a set of all transmission pattern candidates; Scheduling Assignment (SA) time window information indicating a size of a SA time window to be used by the UE for D2D SA transmission; and data time window information indicating a size of a data time window to be used by the UE for D2D data transmission.

The embodiments of the method in the third aspect also apply to the UE.

With the embodiments according to the present disclosure, a base station transmits resource configuration information to a UE. The resource configuration information includes: a transmission pattern index indicating an index of a transmission pattern candidate to be used by the UE for D2D data transmission within a D2D data time window in a set of all transmission pattern candidates; SA time window information indicating a size of a SA time window to be used by the UE for D2D SA transmission; and data time window information indicating a size of a data time window to be used by the UE for D2D data transmission. In this way, the present disclosure provides a solution for controlling resources to be used by the UE for transmission of D2D SA and D2D data.

BRIEF DESCRIPTION OF THE DRAWINGS

The above and other objects, features and advantages will be more apparent from the following description of embodiments with reference to the figures, in which.

DETAILED DESCRIPTION

In the following, preferred embodiments of the present disclosure will be described in detail with reference to the drawings. It should be noted that the following embodiments are illustrative only, rather than limiting the scope of the present disclosure. In the following description, details of well known techniques which are not directly relevant to the present invention will be omitted so as not to obscure the concept of the invention.

In the following, a number of embodiments of the present invention will be detailed in an exemplary application environment of LTE mobile communication system and its subsequent evolutions. Herein, it is to be noted that the present invention is not limited to the application exemplified in the embodiments. Rather, it is applicable to other communication systems, such as the future 5G cellular communication system.

Figure 1:
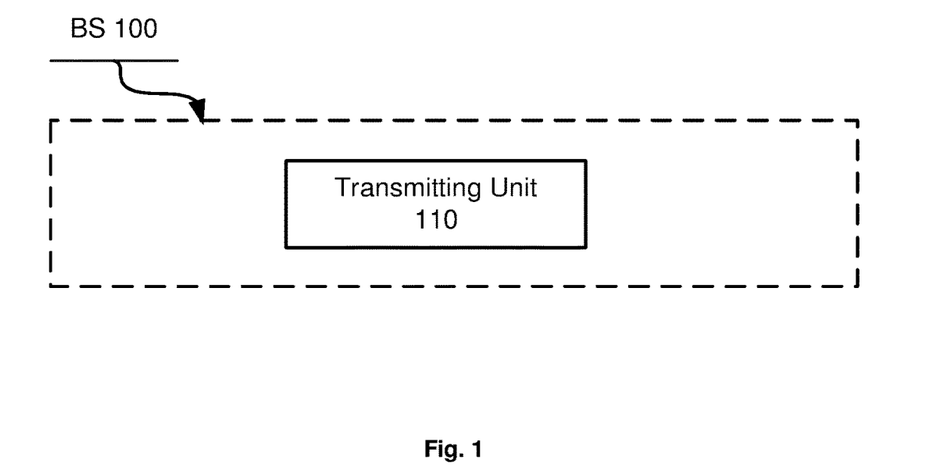
FIG. 1 is a block diagram of a base station according to an embodiment of the present disclosure.

FIG. 1 is a block diagram of a base station 100 according to an embodiment of the present disclosure. As shown in FIG. 1, the base station 100 includes a transmitting unit 110. It can be appreciated by those skilled in the art that the base station 100 further includes other functional units necessary for its functionality, e.g., various processors, memories and the like.

The transmitting unit 110 is configured to transmit resource configuration information to a User Equipment (UE). The resource configuration information includes: a transmission pattern index indicating an index of a transmission pattern candidate to be used by the UE for Device-to-Device (D2D) data transmission within a D2D data time window in a set of all transmission pattern candidates; Scheduling Assignment (SA) time window information indicating a size of a SA time window to be used by the UE for D2D SA transmission; and data time window information indicating a size of a data time window to be used by the UE for D2D data transmission.

In an embodiment, the transmission pattern index, the SA time window information and the data time window information are carried by Radio Resource Control (RRC) signaling.

In an embodiment, the size of the SA time window can be 10 ms, 20 ms or 40 ms (or equivalently, 10, 20 or 40 subframes).

In an embodiment, the data time window information indicates the size of the data time window to be used by the UE for transmission of one or more Medium Access Control (MAC) Protocol Data Units (PDUs) carrying the D2D data.

In an embodiment, the size of the data time window can be 40 ms, 80 ms, 120 ms, 160 ms, 240 ms or 320 ms (or equivalently, 40, 80, 120, 160, 240 or 320 subframes).

In an example, optionally, the base station 100 can further include a resource allocation unit configured to allocate resources to be used by the UE for transmission of D2D SA and D2D data.

In an example, the transmission unit 110 is configured to transmit the resource configuration information to the UE. The resource configuration information indicates the resources allocated by the resource allocation unit. The resource configuration information includes: an SA resource indication indicating resources to be used by the UE for transmission of D2D SA, and a data resource indication indicating resources to be used by the UE for transmission of D2D data associated with the D2D SA.

The SA resource indication includes SA time window information indicating a size of a SA time window to be used by the UE for D2D SA transmission.

The data resource indication further includes data volume indication information indicating a number of MAC PDUs to be transmitted by the UE in the data time window. As an embodiment, the number can be 1, 2, 4 or 8. The number may be indicated by the base station (e.g., evolved NodeB (eNB)) explicitly. Alternatively, instead of being indicated by the base station explicitly, the number can be indicated implicitly by the size of the data time window. That is, there can be a predetermined relationship between the size of the data time window and the number of MAC PDUs that is known to the UE. For example, when the data time window information received by the UE indicates a data time window of 80 ms, the UE can determine that the number of MAC PDUs is 2.

The data resource indication further includes transmission interval information indicating an interval between neighboring MAC PDUs transmitted by the UE in the data time window. As an embodiment, the interval can be 20 ms, 40 ms, 80 ms or 160 ms (or equivalently, 20, 40, 80 or 160 subframes).

The data resource indication further includes transmission volume information indicating a number of subframes occupied by each MAC PDU transmitted by the UE in the data time window. As an embodiment, the number of subframes can be 1, 2, 4 or 8.

The data resource indication further includes transmission pattern information indicating positions of subframes occupied by each MAC PDU transmitted by the UE in the data time window. The transmission pattern information can be represented by a bitmap, as described later.

In an embodiment, the SA time window information, the data time window information, the data volume indication information, the transmission interval information, the transmission volume information and the transmission pattern information are carried by RRC signaling.

In an embodiment, the transmission interval information includes a transmission interval candidate set containing one or more transmission interval candidates each indicating an interval between neighboring MAC PDUs transmitted by the UE in the data time window. For example, the transmission interval candidate set may contain four transmission interval candidates, e.g., {20, 40, 80, 120} (ms) or {40, 80, 120, 160} (ms). Alternatively, the transmission interval candidate set may contain two transmission interval candidates, e.g., {10, 20} (ms), {20, 40} (ms), {40, 80} (ms) or {80, 120} (ms). Each transmission interval candidate in the transmission interval candidate set may be assigned with an index. In this case, the transmission interval information may further include a transmission interval index, indicating the index of the transmission interval candidate to be used by the UE in the transmission interval candidate set.

In an embodiment, the transmission volume information includes a transmission volume candidate set containing one or more transmission volume candidates each indicating a number of subframes occupied by each MAC PDU transmitted by the UE in the data time window. For example, the transmission volume candidate set may contain four transmission volume candidates, e.g., {1, 2, 4, 8}. Each transmission volume candidate in the transmission volume candidate set may be assigned with an index. In this case, the transmission volume information may further include a transmission volume index, indicating the index of the transmission volume candidate to be used by the UE in the transmission volume candidate set.

In an embodiment, the transmission pattern information includes a transmission pattern candidate set containing one or more transmission pattern candidates each indicating positions of subframes occupied by each MAC PDU transmitted by the UE in the data time window. For example, the transmission pattern candidate set may contain 16 transmission pattern candidates. As an example, each transmission pattern candidate can be represented by a bitmap having 40 bits, where the 40 bits represent 40 ms (or 40 subframes), respectively. Each "1" bit represents a position of a subframe occupied by a MAC PDU. In the table below, each line represents a transmission pattern candidate.

TABLE 1

| Transmission Pattern Candidates | | | |
| --- | --- | --- | --- |
| 1000000000 | 0000000000 | 0000000000 | 0000000000 |
| 0100000000 | 0000000000 | 0000000000 | 0000000000 |
| 0010000000 | 0000000000 | 0000000000 | 0000000000 |
| 0001000000 | 0000000000 | 0000000000 | 0000000000 |
| 0000100000 | 0000000000 | 0000000000 | 0000000000 |
| 0000010000 | 0000000000 | 0000000000 | 0000000000 |
| 0000001000 | 0000000000 | 0000000000 | 0000000000 |
| 0000000100 | 0000000000 | 0000000000 | 0000000000 |
| 1000100000 | 0000000000 | 0000000000 | 0000000000 |
| 0100010000 | 0000000000 | 0000000000 | 0000000000 |
| 0010001000 | 0000000000 | 0000000000 | 0000000000 |
| 0001000100 | 0000000000 | 0000000000 | 0000000000 |
| 1000100010 | 0010000000 | 0000000000 | 0000000000 |
| 0010001000 | 1000100000 | 0000000000 | 0000000000 |
| 1000100010 | 0010001000 | 1000100010 | 0000000000 |
| 0010001000 | 1000100010 | 0010001000 | 1000000000 |

Each transmission pattern candidate in the transmission pattern candidate set may be assigned with an index. In this case, the transmission pattern information may further include a transmission pattern index, indicating the index of the transmission pattern candidate to be used by the UE in the transmission pattern candidate set.

Each of the transmission interval index, the transmission volume index and the transmission pattern index can be represented by an integer. For example, an integer "1" may represent the first candidate in the respective set, an integer "2" may represent the second candidate in the respective set, and so on. Alternatively, each of the transmission interval index, the transmission volume index and the transmission pattern index can be represented by one or more bits. For example, bit(s) "0", "00" or "0000" represent the first candidate in the respective set, bit(s) "1", "01" or "0001" may represent the second candidate in the respective set, and so on.

In an embodiment, the SA time window information, the data time window information, the data volume indication information, the transmission interval candidate set, the transmission volume candidate set and the transmission pattern candidate set can be carried by RRC signaling. The transmission interval index, the transmission volume index and the transmission pattern index can be carried by information bits in Downlink Control Information (DCI) Format 0. For example, the transmission interval index, the transmission volume index and the transmission pattern index can be transmitted to the UE via PDCCH or EPDCCH signaling in DCI Format 0. For example, some or all of the bits in flags for Format 0/Format 1A, NDI, CQI Request, SRS Request, CIF bits in Format 0 can be used.

Figure 2:
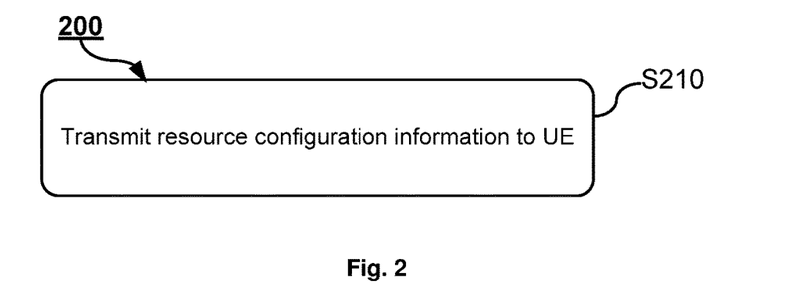
FIG. 2 is a flowchart illustrating a method in a base station according to an embodiment of the present disclosure.

FIG. 2 is a flowchart illustrating a method 200 in a base station according to an embodiment of the present disclosure. It is to be noted that all the features described above in connection with the above embodiment of the base station 100 also apply to the following method embodiment. The method 200 can be performed by the above base station 100 and include the following steps.

At step S210, resource configuration information is transmitted to a UE. The resource configuration information includes: a transmission pattern index indicating an index of a transmission pattern candidate to be used by the UE for Device-to-Device (D2D) data transmission within a D2D data time window in a set of all transmission pattern candidates; Scheduling Assignment (SA) time window information indicating a size of a SA time window to be used by the UE for D2D SA transmission; and data time window information indicating a size of a data time window to be used by the UE for D2D data transmission.

In an embodiment, the transmission pattern index, the SA time window information and the data time window information are carried by Radio Resource Control (RRC) signaling.

In an example, optionally, the method 200 can further include allocating resources to be used by the UE for transmission of D2D SA and D2D data.

In an example, in the step S210, the resource configuration information is transmitted to the UE. The resource configuration information indicates the resources allocated by the resource allocation unit. The resource configuration information includes: an SA resource indication indicating resources to be used by the UE for transmission of D2D SA, and a data resource indication indicating resources to be used by the UE for transmission of D2D data associated with the D2D SA.

In an embodiment, the SA resource indication includes SA time window information indicating a size of a SA time window to be used by the UE for D2D SA transmission.

In an embodiment, the data resource indication includes: data time window information indicating the size of the data time window to be used by the UE for transmission of one or more Medium Access Control (MAC) Protocol Data Units (PDUs) carrying the D2D data; data volume indication information indicating a number of MAC PDUs to be transmitted by the UE in the data time window; transmission interval information indicating an interval between neighboring MAC PDUs transmitted by the UE in the data time window; transmission volume information indicating a number of subframes occupied by each MAC PDU transmitted by the UE in the data time window; and transmission pattern information indicating positions of subframes occupied by each MAC PDU transmitted by the UE in the data time window.

In an embodiment, the SA time window information, the data time window information, the data volume indication information, the transmission interval information, the transmission volume information and the transmission pattern information are carried by RRC signaling.

In an embodiment, the transmission interval information includes: a transmission interval candidate set containing one or more transmission interval candidates each indicating an interval between neighboring MAC PDUs transmitted by the UE in the data time window; and a transmission interval index indicating the index of the transmission interval candidate to be used by the UE in the transmission interval candidate set. The transmission volume information includes: a transmission volume candidate set containing one or more transmission volume candidates each indicating a number of subframes occupied by each MAC PDU transmitted by the UE in the data time window; and a transmission volume index indicating the index of the transmission volume candidate to be used by the UE in the transmission volume candidate set. The transmission pattern information includes: a transmission pattern candidate set containing one or more transmission pattern candidates each indicating positions of subframes occupied by each MAC PDU transmitted by the UE in the data time window; and a transmission pattern index indicating the index of the transmission pattern candidate to be used by the UE in the transmission pattern candidate set.

In an embodiment, the SA time window information, the data time window information, the data volume indication information, the transmission interval candidate set, the transmission volume candidate set and the transmission pattern candidate set can be carried by RRC signaling. The transmission interval index, the transmission volume index and the transmission pattern index can be carried by information bits in Downlink Control Information (DCI) Format 0.

Figure 3:
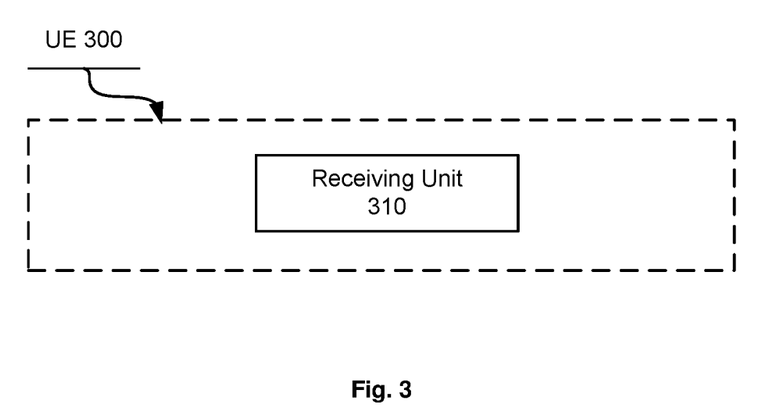
FIG. 3 is a block diagram of a UE according to an embodiment of the present disclosure.

FIG. 3 is a block diagram of a UE 300 according to an embodiment of the present disclosure. As shown in FIG. 3, the UE 300 includes a receiving unit 310. It can be appreciated by those skilled in the art that the UE 300 further includes other functional units necessary for its functionality, e.g., various processors, memories and the like.

The receiving unit 310 is configured to receive resource configuration information from a base station. The resource configuration information comprises: a transmission pattern index indicating an index of a transmission pattern candidate to be used by the UE for Device-to-Device (D2D) data transmission within a D2D data time window in a set of all transmission pattern candidates; Scheduling Assignment (SA) time window information indicating a size of a SA time window to be used by the UE for D2D SA transmission; and data time window information indicating a size of a data time window to be used by the UE for D2D data transmission.

In an embodiment, the transmission pattern index, the SA time window information and the data time window information are carried by Radio Resource Control (RRC) signaling.

In an example, the receiving unit 310 is configured to receive the resource configuration information from the base station. The resource configuration information indicates resources allocated by the base station for the UE to transmit D2D SA and D2D data. The resource configuration information includes: an SA resource indication indicating resources to be used by the UE for transmission of D2D SA, and a data resource indication indicating resources to be used by the UE for transmission of D2D data associated with the D2D SA.

Optionally, the UE 300 can further include a transmission unit configured to transmit the D2D SA and the D2D data based on the resources indicated by the resource configuration information.

In an embodiment, the SA resource indication includes SA time window information indicating a size of a SA time window to be used by the UE for D2D SA transmission.

In an embodiment, the data resource indication includes: data time window information indicating the size of the data time window to be used by the UE for transmission of one or more Medium Access Control (MAC) Protocol Data Units (PDUs) carrying the D2D data; data volume indication information indicating a number of MAC PDUs to be transmitted by the UE in the data time window; transmission interval information indicating an interval between neighboring MAC PDUs transmitted by the UE in the data time window; transmission volume information indicating a number of subframes occupied by each MAC PDU transmitted by the UE in the data time window; and transmission pattern information indicating positions of subframes occupied by each MAC PDU transmitted by the UE in the data time window.

In an embodiment, the SA time window information, the data time window information, the data volume indication information, the transmission interval information, the transmission volume information and the transmission pattern information are carried by RRC signaling.

In an embodiment, the transmission interval information includes: a transmission interval candidate set containing one or more transmission interval candidates each indicating an interval between neighboring MAC PDUs transmitted by the UE in the data time window; and a transmission interval index indicating the index of the transmission interval candidate to be used by the UE in the transmission interval candidate set. The transmission volume information includes: a transmission volume candidate set containing one or more transmission volume candidates each indicating a number of subframes occupied by each MAC PDU transmitted by the UE in the data time window; and a transmission volume index indicating the index of the transmission volume candidate to be used by the UE in the transmission volume candidate set. The transmission pattern information includes: a transmission pattern candidate set containing one or more transmission pattern candidates each indicating positions of subframes occupied by each MAC PDU transmitted by the UE in the data time window; and a transmission pattern index indicating the index of the transmission pattern candidate to be used by the UE in the transmission pattern candidate set.

In an embodiment, the SA time window information, the data time window information, the data volume indication information, the transmission interval candidate set, the transmission volume candidate set and the transmission pattern candidate set can be carried by RRC signaling. The transmission interval index, the transmission volume index and the transmission pattern index can be carried by information bits in Downlink Control Information (DCI) Format 0.

Figure 4:
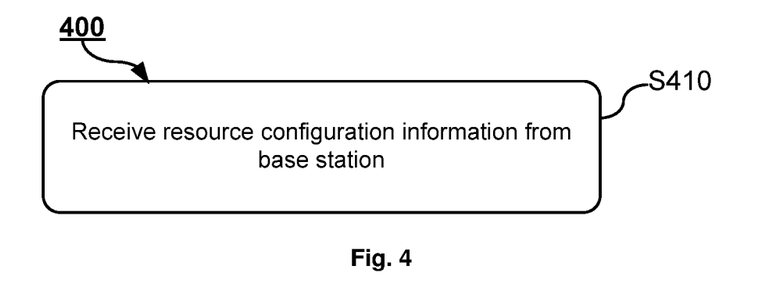
FIG. 4 is a flowchart illustrating a method in a UE according to an embodiment of the present disclosure.

FIG. 4 is a flowchart illustrating a method 400 in a UE according to an embodiment of the present disclosure. It is to be noted that all the features described above in connection with the above embodiment of the UE 300 also apply to the following method embodiment. The method 400 can be performed by the above UE 300 and include the following steps.

At step S410, resource configuration information is received from a base station. The resource configuration information includes: a transmission pattern index indicating an index of a transmission pattern candidate to be used by the UE for Device-to-Device (D2D) data transmission within a D2D data time window in a set of all transmission pattern candidates; Scheduling Assignment (SA) time window information indicating a size of a SA time window to be used by the UE for D2D SA transmission; and data time window information indicating a size of a data time window to be used by the UE for D2D data transmission.

In an embodiment, the transmission pattern index, the SA time window information and the data time window information are carried by Radio Resource Control (RRC) signaling.

In an example, in the step S410, the resource configuration information is received from the base station. The resource configuration information indicates resources allocated by the base station for the UE to transmit D2D SA and D2D data. The resource configuration information includes: an SA resource indication indicating resources to be used by the UE for transmission of D2D SA, and a data resource indication indicating resources to be used by the UE for transmission of D2D data associated with the D2D SA.

In an example, optionally, the method 400 can further include transmitting the D2D SA and the D2D data based on the resources indicated by the resource configuration information.

In an embodiment, the SA resource indication includes SA time window information indicating a size of a SA time window to be used by the UE for D2D SA transmission.

In an embodiment, the data resource indication includes: data time window information indicating the size of the data time window to be used by the UE for transmission of one or more Medium Access Control (MAC) Protocol Data Units (PDUs) carrying the D2D data; data volume indication information indicating a number of MAC PDUs to be transmitted by the UE in the data time window; transmission interval information indicating an interval between neighboring MAC PDUs transmitted by the UE in the data time window; transmission volume information indicating a number of subframes occupied by each MAC PDU transmitted by the UE in the data time window; and transmission pattern information indicating positions of subframes occupied by each MAC PDU transmitted by the UE in the data time window.

In an embodiment, the SA time window information, the data time window information, the data volume indication information, the transmission interval information, the transmission volume information and the transmission pattern information are carried by RRC signaling.

In an embodiment, the transmission interval information includes: a transmission interval candidate set containing one or more transmission interval candidates each indicating an interval between neighboring MAC PDUs transmitted by the UE in the data time window; and a transmission interval index indicating the index of the transmission interval candidate to be used by the UE in the transmission interval candidate set. The transmission volume information includes: a transmission volume candidate set containing one or more transmission volume candidates each indicating a number of subframes occupied by each MAC PDU transmitted by the UE in the data time window; and a transmission volume index indicating the index of the transmission volume candidate to be used by the UE in the transmission volume candidate set. The transmission pattern information includes: a transmission pattern candidate set containing one or more transmission pattern candidates each indicating positions of subframes occupied by each MAC PDU transmitted by the UE in the data time window; and a transmission pattern index indicating the index of the transmission pattern candidate to be used by the UE in the transmission pattern candidate set.

In an embodiment, the SA time window information, the data time window information, the data volume indication information, the transmission interval candidate set, the transmission volume candidate set and the transmission pattern candidate set can be carried by RRC signaling. The transmission interval index, the transmission volume index and the transmission pattern index can be carried by information bits in Downlink Control Information (DCI) Format 0.

Regarding the SA resource indication and the data resource indication, all the details described above in connection with the base station 100 also apply to the method 200, the UE 300 and the method 400.

With the embodiments according to the present disclosure, a base station allocates resources to be used by a UE for transmission of D2D SA and D2D data, and transmits to the UE resource configuration information indicating the allocated resource. The resource configuration information includes: an SA resource indication indicating resources to be used by the UE for transmission of D2D SA, and a data resource indication indicating resources to be used by the UE for transmission of D2D data associated with the D2D SA. Accordingly, the UE receives the resource configuration information from the base station, and transmits the D2D SA and the D2D data based on the resources indicated by the resource configuration information. In this way, the present disclosure provides a solution for controlling resources to be used by the UE for transmission of D2D SA and D2D data.

It can be appreciated that the above embodiments of the present disclosure can be implemented in software, hardware or any combination thereof. For example, the internal components of the base station and the UE in the above embodiments can be implemented using various devices including, but not limited to, analog circuit device, digital circuit device, Digital Signal Processing (DSP) circuit, programmable processor, Application Specific Integrated Circuit (ASIC), Field Programmable Gate Array (FPGA), Programmable Logic Device (CPLD) and the like.

In the present disclosure, the term "base station" refers to a mobile communication data and control exchange center with a large transmit power and a wide coverage area and including functions such as resource allocation/scheduling, data reception/transmission and the like. The term "user equipment" refers to a user mobile terminal, including e.g., a mobile phone, a notebook computer and other terminal devices that can wirelessly communicate with a base station or and micro base station.

Further, the embodiments of the present disclosure can be implemented in computer program products. More specifically, a computer program product can be a product having a computer readable medium with computer program logics coded thereon. When executed on a computing device, the computer program logics provide operations for implementing the above solutions according to the present disclosure. When executed on at least one processor in a computing system, the computer program logics cause the processor to perform the operations (methods) according to the embodiments of the present disclosure. This arrangement of the present disclosure is typically provided as software, codes and/or other data structures provided or coded on a computer readable medium (such as an optical medium, e.g., CD-ROM, a floppy disk or a hard disk), or firmware or micro codes on other mediums (such as one or more ROMs, RAMs or PROM chips), or downloadable software images or shared databases in one or more modules. The software, firmware or arrangement can be installed in a computing device to cause one or more processors in the computing device to perform the solutions according to the embodiments of the present disclosure.

The present disclosure has been described above with reference to the preferred embodiments thereof. It should be understood that various modifications, alternations and additions can be made by those skilled in the art without departing from the spirits and scope of the present disclosure. Therefore, the scope of the present disclosure is not limited to the above particular embodiments but only defined by the claims as attached and the equivalents thereof.

The invention claimed is:

1. A User Equipment (UE), comprising:
a processor,
a memory storing instructions, wherein
the memory stores instructions that causes the processor to:
receive transmission pattern information which indicates one or more transmission pattern candidates within all transmission pattern candidates;
receive another information which indicates, as a time period for D2D transmission, a number of subframes;
receive a transmission pattern index by a DCI format; and
perform D2D transmission based on a transmission pattern indicated by the transmission pattern index, the transmission pattern being one of the one or more transmission pattern candidates;
the transmission pattern information is received in an RRC signal;
the another information is received in an RRC signal;
the number is selected from a plurality of numbers which are different from each other and include (i) 40 and (ii) one or more numbers each of which is a multiple of 40; and
the transmission pattern indicates one or more subframes used for data transmission in the time period.

2. A method performed by a User Equipment (UE), comprising:
receiving transmission pattern information which indicates one or more transmission pattern candidates within all transmission pattern candidates;
receiving another information which indicates, as a time period for D2D transmission, a number of subframes;
receiving a transmission pattern index by a DCI format; and
performing D2D transmission based on a transmission pattern indicated by the transmission pattern index, the transmission pattern being one of the one or more transmission pattern candidates; wherein
the transmission pattern information is received in an RRC signal,
the another information is received in an RRC signal,
the number is selected from a plurality of numbers which are different from each other and include (i) 40 and (ii) one or more numbers each of which is a multiple of 40, and
the transmission pattern indicates one or more subframes used for data transmission in the time period.

3. A base station apparatus, comprising:
a processor,
a memory storing instructions,
wherein the memory stores instructions that causes the processor to:
transmit transmission pattern information which indicates one or more transmission pattern candidates within all transmission pattern candidates;
transmit another information which indicates, as a time period for D2D transmission, a number of subframes; and
transmit a transmission pattern index by a DCI format; wherein
the transmission pattern index indicates a transmission pattern used for the D2D transmission, the transmission pattern is one of the one or more transmission pattern candidates, the transmission pattern information is transmitted in an RRC signal, the another information is transmitted in an RRC signal, the number is selected from a plurality of numbers which are different from each other and include (i) 40 and (ii) one or more numbers each of which is a multiple of 40, and the transmission pattern indicates one or more subframes used for data transmission in the time period.

4. A method performed by a base station apparatus, comprising:

transmitting transmission pattern information which indicates one or more transmission pattern candidates within all transmission pattern candidates;

transmitting another information which indicates, as a time period for D2D transmission, a number of subframes; and transmitting a transmission pattern index by a DCI format; wherein the transmission pattern index indicates a transmission pattern used for the D2D transmission, the transmission pattern is one of the one or more transmission pattern candidates, the transmission pattern information is transmitted in an RRC signal, the another information is transmitted in an RRC signal, the number is selected from a plurality of numbers which are different from each other and include (i) 40 and (ii) one or more numbers each of which is a multiple of 40, and the transmission pattern indicates one or more subframes used for data transmission in the time period.

* * * * *